United States Patent [19]

O'Brien

[11] 4,220,173

[45] Sep. 2, 1980

[54] TIME DELAY FLUID VALVE

[76] Inventor: John W. O'Brien, 607 S. Kelly St., Harrison, Ark. 72601

[21] Appl. No.: 929,338

[22] Filed: Jul. 31, 1978

[51] Int. Cl.³ ............... F16K 31/122; F16K 51/00
[52] U.S. Cl. ............................ 137/239; 137/544; 138/43; 251/47
[58] Field of Search ............... 251/25, 205, 47; 137/237, 238, 239

[56] References Cited

U.S. PATENT DOCUMENTS

| | | | |
|---|---|---|---|
| 1,754,138 | 4/1930 | Agee | 251/205 X |
| 2,580,433 | 1/1952 | Kain | 137/624.14 |
| 2,661,766 | 12/1953 | Adams | 137/624.14 |
| 2,830,784 | 4/1958 | Placette | 251/25 X |
| 3,385,166 | 5/1968 | Kroffke | 137/624.14 X |
| 3,430,652 | 3/1969 | Struck | 137/624.14 |

Primary Examiner—William R. Cline
Assistant Examiner—Richard Gerard
Attorney, Agent, or Firm—Lowe, Kokjer, Kircher, Wharton & Bowman

[57] ABSTRACT

A fluid operated valve device which effects a time delay in the shifting of a main valve spool. Pressurized pilot fluid is metered at a controlled rate through an air filter and a spiral groove which is restricted in size to delay the pressure build up of the fluid. When the pressure builds up sufficiently, a timer piston is shifted to break its seal with the main valve spool so that fluid can pass through the piston into a pressure chamber. The fluid pressure in the chamber shifts the main valve spool to control application of fluid to the load. When the pilot pressure is relieved, fluid flows at a high speed along a return path that passes the base of the air filter to create a suction effect which extracts dirt from the filter and purges it from the system. The pressure reduction allows springs to return the main valve spool and the timer piston into sealing position. A sleeve cooperates with the pilot circuit and the timer piston to compensate for increased pilot pressure such that the time delay changes predictably with pressure changes.

15 Claims, 2 Drawing Figures

TIME DELAY FLUID VALVE

BACKGROUND AND SUMMARY OF THE INVENTION

This invention relates generally to valves and more particularly to a fluid operated timing device which delays the shifting of a valve spool.

Time delay devices which delay shifting of a valve spool find a great many applications in various industries. At present, electrical time delay relays are typically used to operate solenoid controlled air valves which provide the desired control of the air flow. As can easily be appreciated, devices of this nature require complicated circuitry and electrical components which make them complex and costly. In order to maintain sufficient consistency and reliability, the air valves are either small in capacity or are simple two-way designs that are limited as to the applications in which they can be used.

The mechanical or fluid operated timing devices that have been proposed in the past are likewise characterized by high cost and undue complexity. The main valve spool operates directly with the delay mechanism so that only valve spools of a single size can be controlled by a particular delay mechanism. These devices also suffer from lack of adjustability as to the duration of the time delay and from fluctuations in the time delay from cycle to cycle. In addition, the proposed devices are overly sensitive to pressure variations and are unpredictable as to the effect of pressure changes on the time delay.

Existing time delay valves use an excessive amount of compressed air in their pilot circuits and are thus expensive to operate. Also, it is common for only the main air source to supply the pilot fluid so that the relatively wide pressure fluctuations that often occur in the large volume main air flow are translated to the pilot circuit, thereby adversely affecting the delay mechanism. Dirt and other foreign matter often clogs up the timing circuit and necessitates that the valve be frequently disassembled and thoroughly cleaned in order to maintain it in proper operating condition.

In view of these and other problems associated with existing time delay devices, it is apparent that a need exists for an effective and reliable fluid operated time delay mechanism for valve spools. The primary object of the present invention is to meet that need.

More specifically, it is an object of the invention to provide a time delay fluid valve wherein the duration of the time delay may be easily and accurately adjusted over a wide range.

Another object of the invention is to provide a time delay valve of the character described in which operation of the timing mechanism is separate from and independent of the main valve spool. Accordingly, valve spools of different sizes and styles can be controlled without affecting the operational characteristics of the timing circuit.

Still another object of the invention is to provide a time delay valve of the character described which achieves a consistent time delay from cycle to cycle.

A further object of the invention is to provide a time delay valve of the character described which responds to pressure variations in a predictable manner. The compensating sleeve arrangement for the timer piston can be selected to achieve a substantially constant time delay for all pressures encountered during normal use. Alternatively, in situations where a longer or shorter time delay is desired for varying pressure, the sleeve can be selected to provide a predictable change in the time delay as the pressure changes.

An additional object of the invention is to provide a time delay valve of the character described which minimizes the use of air in the pilot circuit and which is adapted to receive pilot fluid from either the main air supply or a separate pilot supply.

Yet another object of the invention is to provide a time delay valve of the character described wherein dirt and other contaminants are purged from the pilot circuit during each cycle of the timer mechanism.

A still further object of the invention is to provide a time delay valve of the character described which is simple and economical to construct and which operates reliably in trouble-free fashion.

Other and further objects of the invention, together with the features of novelty appurtenant thereto, will appear in the course of the following description.

DETAILED DESCRIPTION OF THE INVENTION

Figure 1:
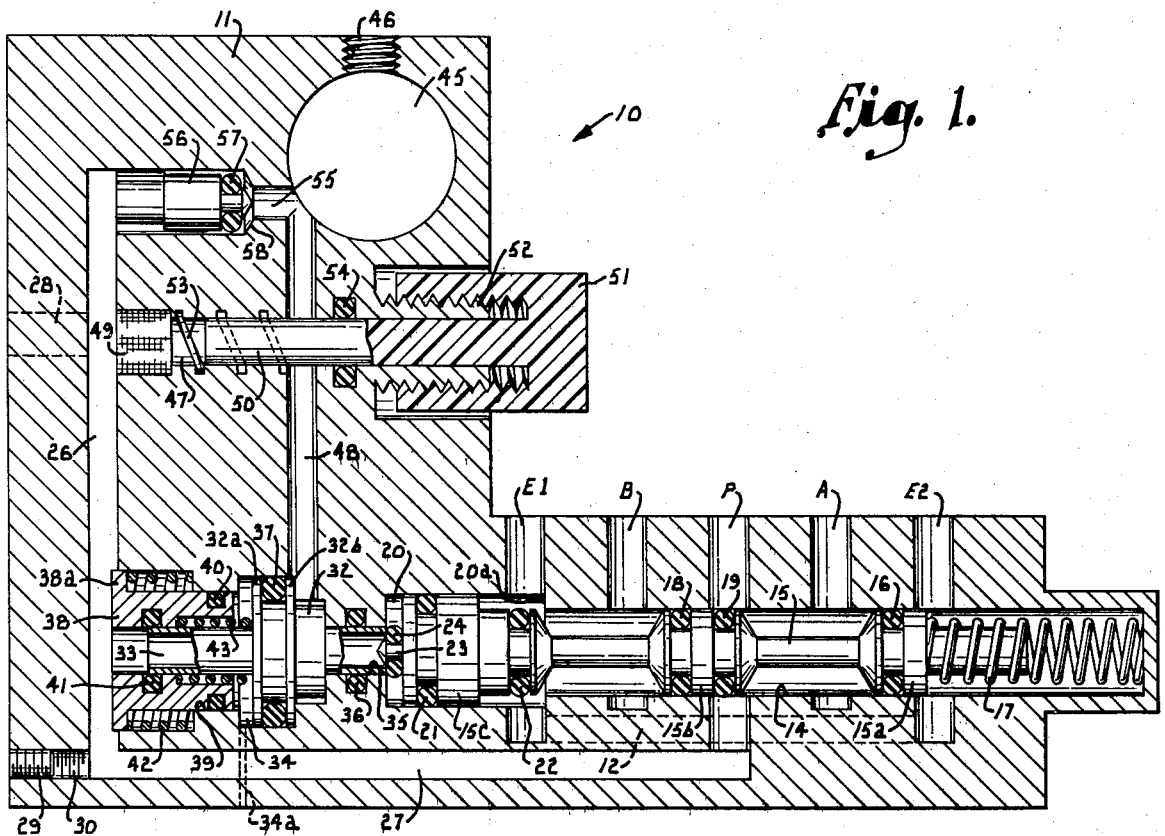
Figure 2:
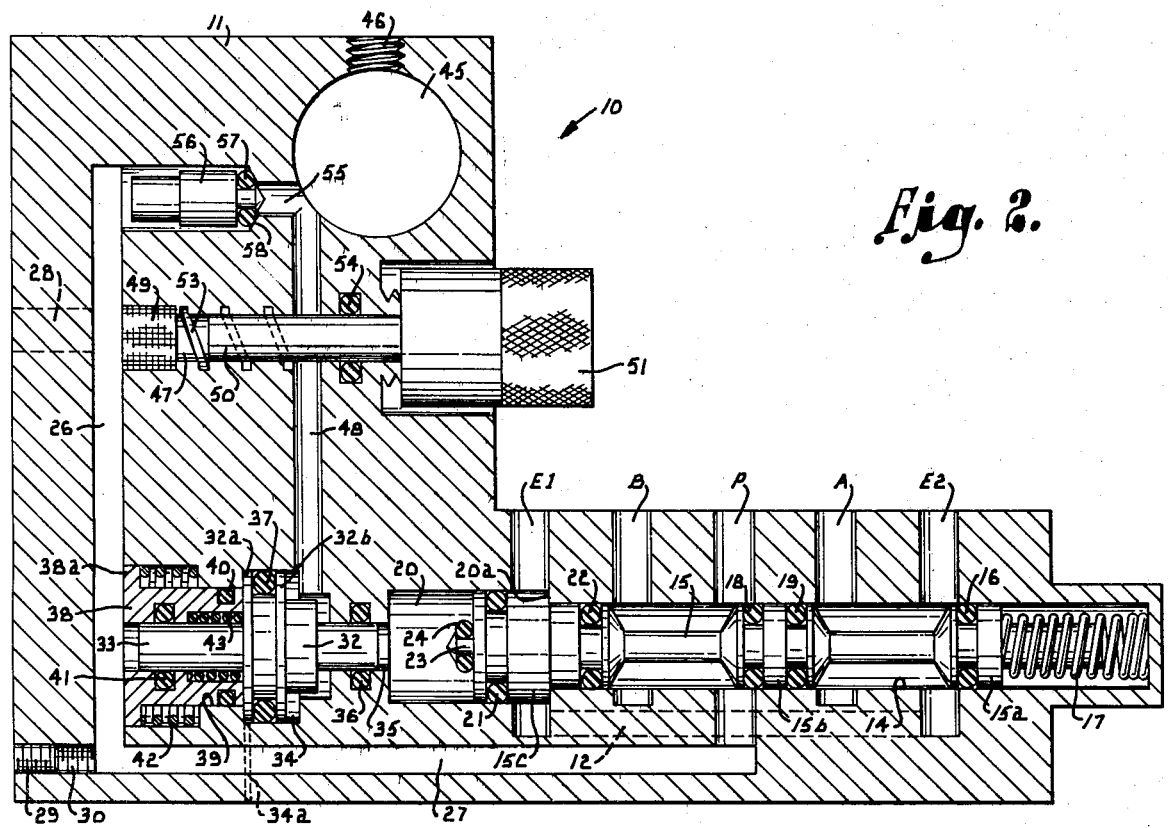

In the accompanying drawing which forms a part of the specification and is to be read in conjunction therewith and in which like reference numerals are used to indicate like parts in the various views:

FIG. 1 is a sectional view of a time delay valve device constructed according to a preferred embodiment of the present invention, with the components in the normal position prior to application of pilot pressure; and FIG. 2 is a sectional view similar to FIG. 1 but showing the valve components in the timed out position.

Referring to the drawing in detail, numeral 10 generally designates a time delay fluid valve constructed in accordance with the present invention. The operating components of the valve are housed within a valve body 11 in the form of a block.

The valve body 11 has a pressure inlet port P which may be connected with a source of compressed air for moving a load such as a double acting pneumatic cylinder or the like (not shown) controlled by the valve. Load ports A and B are formed in body 11 near port P and may be connected with the load. For example, the valve body may be mounted on a subplate (not shown) and hoses (not shown) communicating with ports A and B may be connected with the pneumatic cylinder on opposite sides of its piston such that pressurization of port A extends the piston rod and pressurization of port B retracts the rod. A pair of exhaust ports E1 and E2 serve to exhaust the air and are connected with one another by a passage 12 formed in the valve body 11.

Each of the valve ports leads to a cylindrical bore 14 which is formed internally of valve body 11. The bore 14 receives a main valve spool 15 which is able to slide axially in the bore. Spool 15 has an enlarged base 15a which carries an o-ring 16 that seals against the wall of bore 14. A compression spring 17 is coiled around the base end of spool 15 and acts against base 15a in a manner urging the spool to the left toward the position shown in FIG. 1.

A central portion 15b of the valve spool carries a pair of o-rings 18 and 19 that likewise seal against the wall of bore 14. An enlarged head portion 15c of the valve spool is located in an enlarged end portion of bore 14 which provides a cylindrical pressure chamber 20. The head portion 15c carries a large o-ring 21 which provides a "floating" type seal against the wall of chamber 20. This floating seal normally allows a small amount of air to leak past o-ring 21, although a fluid tight seal is effected when a large surge of air is encountered, as when pressurized air is admitted to chamber 20.

Movement of spool 15 to the right is limited by engagement of head portion 15c with a shoulder 20a formed at the junction of bore 14 with chamber 20. An o-ring 22 which seals against the wall of bore 14 is carried on the portion of spool 15 adjacent to head 15c. The head portion of spool 15 has a small stub 23 projecting into chamber 20 and carrying a relatively small o-ring 24.

Spring 17 normally maintains spool 15 in the FIG. 1 position wherein pressure port P is connected with load port A to deliver air to the load in the desired manner, as to the base end of a double acting pneumatic cylinder (not shown) to extend its piston rod. Port B is connected with exhaust port E1 to exhaust air from the cylinder. Conversely, when spool 15 is in the position of FIG. 2, port B is connected with port P and port A is connected with exhaust port E2. Air is then delivered to the pneumatic cylinder in a manner to retract its piston rod. It is to be understood that spool 15 may serve to direct air to other types of loads and that its construction and operation may be varied to suit the type of load it is to control.

In accordance with the present invention, valve 10 has a pilot circuit that includes a cavity 26 formed internally of the valve body 11. Pilot fluid may be delivered to cavity 26 from the main air supply through a passage 27 that leads from pressure port P to the cavity. Alternatively, pilot fluid may be delivered to cavity 26 from a separate pilot supply which may be connected with a port 28 that leads to the cavity. A set screw 29 is received in an opening 30 and may be threaded into the opening far enough to block passage 27 in the case where a separate pilot supply is to be used. Pilot fluid is then supplied to and exhausted from cavity 26 through port 28 under the control of a suitable pilot valve (not shown). With passage 27 blocked and a separate pilot supply connected with the pilot circuit, air can be permanently connected to pressure port P of the main air valve circuit without affecting operation of the pilot circuit.

The time delay mechanism of the valve includes a timer piston 32 which is carried on a piston rod 33 formed by a hollow tube. Rod 33 extends centrally through piston 32 and the hollow interior of the rod (see FIG. 1) presents an air passage extending axially through the piston and rod. Piston 32 is slidably received in a cavity 34, while the leading or right end portion of rod 33 is slidable in a bore 35 that extends from cavity 34 to the pressure chamber 20. An o-ring 36 mounted in the wall of passage 35 seals against the surface of rod 33. Movement of piston 32 to the right is limited to the position of FIG. 1 due to engagement of the piston with a shoulder formed at the junction of cavity 34 with bore 35. Movement of the piston to the left is limited to the FIG. 2 position due to its engagement with another shoulder formed at the left end of cavity 34. The left end of cavity 34 is vented to the atmosphere by an air vent 34a such that the left portion of the cavity is maintained at atmospheric pressure.

Piston 32 includes a pair of spaced flanges 32a and 32b between which an o-ring 37 is carried to seal against the wall of cavity 34. Flange 32b provides a pressure surface for shifting piston 32 from the FIG. 1 position to the FIG. 2 position, as will be explained in more detail.

The trailing or left end portion of piston rod 33 receives a spool or sleeve 38 which serves as a slide member that compensates for fluctuations in the pilot pressure. The sleeve 38 has a central bore in which rod 33 is slidably received. The sleeve is slidably received in a passage 39 formed in valve body 11 in extension between cavities 26 and 34. An o-ring 40 seals the sleeve with the wall of passage 39, while another o-ring 41 seals the bore of the sleeve with the outside surface of rod 33.

Sleeve 38 has at its left end a head portion which includes an enlarged flange 38a. The air in cavity 26 acts against the body of sleeve 38 to urge the sleeve to the right. This biasing force of the air is counteracted in part by a compression spring 42 which is coiled around the sleeve. The spring acts against flange 38a and a shoulder formed in the wall of passage 39.

Another compression spring 43 acts as a return spring to bias piston 32 toward the FIG. 1 position. The return spring 43 is coiled around piston rod 33 and is disposed at a recessed location within a cavity area formed within sleeve 38. Spring 43 acts against sleeve 38 and flange 32a of the piston to urge the piston and sleeve away from one another. The recessed location of spring 43 is important in that it reduces the length of the timer piston assembly.

The air in cavity 26 is delivered at a metered rate to a relatively large reservoir 45 formed within the valve block 11. A port 46 which may be plugged leads to reservoir 45 so that pressure fluctuations therein can be monitored during operation of the valve. A bore 47 extends into block 11 and leads to cavity 26. Bore 47 intersects with a passage 48 that extends from reservoir 45 to the right side of cavity 34. An air filter 49 is located in an enlarged portion of bore 47 at the end adjacent cavity 26 to filter dirt and other foreign materials and contaminants from the air.

A rod 50 fits tightly in bore 47 and has a knurled adjustment knob 51 on its end. The knob 51 is accessible from the exterior of body 11 and is internally threaded at 52 (FIG. 1) to establish a threaded connection with mating threads of the valve body. Rod 50 can thus be threaded into and out of bore 47 to adjust the location of its left end.

A small spiral groove 53 is cut in the wall of bore 47 to provide a metering passage adjacent the outer surface of rod 50. Groove 53 spirals around the rod from the enlarged area of bore 47 adjacent filter 49 to the area at which the bore intersects with passage 48. The metering groove is restricted in size so that the air flows through it at a relatively slow, metered rate. An o-ring 54 is recessed in the wall of bore 47 to seal against rod 50 at a location between passage 48 and knob 51.

Threading of rod 50 into and out of bore 47 varies the effective length of groove 53 by adjusting the position of the end of the rod along the length of the groove. Consequently, the time required for air to meter through groove 53 may be adjusted. The spiral configuration of the groove allows for a fine adjustment of the metering rate and presents a relatively long metering passage without requiring a corresponding length of the rod.

A return passage 55 is formed in the valve body 11 to direct air along a return path from reservoir 45 to cavity 26. A poppet 56 is disposed in an enlarged portion of passage 55 and carries an o-ring 57. A seat 58 formed in passage 55 receives the o-ring 57 to thereby normally seal the passage against the flow of air. When the pressure in cavity 26 is greater than that in reservoir 45, poppet 56 is forced to the right (FIG. 2) so that o-ring 57 engages with its seat 58 to block passage 55. Conversely, when the pressure in reservoir 45 exceeds that in cavity 26, the pressure differential across poppet 56 forces it to the left away from its seat (FIG. 1) to break the seal and permit air to flow around the poppet through passage 55 from reservoir 45 to cavity 26. The effective size of passage 55 is much greater than that of the restricted metering groove 53. Therefore, the return flow of air through passage 55 is at a much higher velocity than is the metered flow of air through groove 53.

In operation, spring 17 normally urges valve spool 15 to the left while spring 43 simultaneously urges piston 32 to the right such that o-ring 24 tightly seals against the right or outlet end of the hollow piston rod 33. This seal prevents the air from passing through rod 33 into the pressure chamber 20. The components are thus ordinarily in the FIG. 1 position wherein spool 15 is located to connect pressure port P with port A and port B with exhaust port E1.

When air is supplied to the pilot circuit either through passage 27 or port 28, the pilot air enters cavity 26 and flows across the base of filter 49 to force poppet 56 against its seat 58. The pilot air enters the inlet or left end of the piston rod 33 but is unable to flow out of the rod into chamber 20 due to the seal of o-ring 24 against the outlet end of the rod.

The pilot air drifts through the air filter 49 and is thereby filtered of dirt and other contaminants. The air then flows slowly through the spiral groove 53 and into passage 48 at a metered rate. After a time delay long enough to permit the air pressure in reservoir 45 to build up sufficiently to overcome the friction and spring forces acting on piston 32, the force of the air against flange 32b shifts the timer piston 32 to the left from the position of FIG. 1 to the position of FIG. 2. As a result, the seal of o-ring 24 is broken and air flows through the passage presented within the hollow piston rod 33. The air that surges into chamber 20 from rod 33 acts against the head portion 15c of valve spool 15 to overcome the force of spring 17 and shift the spool to the right from the FIG. 1 position to the FIG. 2 position. This shifting of the valve spool connects port P with port B and port A with port E2 to properly direct air to and from the pneumatic cylinder or other load (not shown) that is controlled by the valve.

When the pilot pressure is relieved, the pressure in cavity 26 drops below that in reservoir 45, and poppet 56 is displaced from its seat to permit the air to flow around the poppet through passage 55 from reservoir 45 to cavity 26 and then out of the pilot circuit. Due to the relatively large size of passage 55, the air flows at a high rate of speed along the return path. The burst of high speed air sweeps across the base or left end of filter 49 to create a suction effect which draws out of the filter any dirt or other foreign material. These materials are carried with the air out of the valve to thereby purge the pilot circuit of contaminants each time a timing cycle is completed. The return air flow through the small metering groove 53 is negligible compared with that through passage 55 and has a minimal effect on the response characteristics of the return portion of the cycle.

When the pressure in reservoir 45 drops sufficiently, the compressed reset spring 43 forces piston 32 to the right. At the same time, spring 17 shifts valve spool 15 back to the left since the pressure in chamber 20 drops with the drop in the pilot pressure. Piston 32 and spool 15 are thus returned to the FIG. 1 position wherein o-ring 24 seals the outlet end of piston rod 33. The floating seal of the large o-ring 21 allows any residual air remaining in chamber 20 to leak out of the chamber after the seal between spool 15 and rod 33 has been re-established.

Sleeve 38 assists in compensating for variations in pilot pressure to prevent such variations from adversely affecting the timing mechanism. When cavity 26 is pressurized, the force of the air against the body of sleeve 38 tends to push the sleeve to the right in proportion to the pilot pressure and the surface area of the sleeve since the left end portion of cavity 34 is at atmospheric pressure. This movement of sleeve 38 compresses spring 43 so that an increased pressure in reservoir 45 is necessary to shift piston 32 to the left. Spring 42 counteracts in part the force of the air on sleeve 38 to assure that movement of the sleeve does not occur until a predetermined minimum pilot pressure is reached. If the sleeve should bottom out against piston 32, further increases in the pilot pressure increase the force of the sleeve on the piston without any additional travel.

It should be apparent that the response characteristics of the timer circuit are dependent on the strength of spring 42 and the surface area of the pressure face of sleeve 38. For example, if the area of sleeve 38 is relatively small in comparison with the strength of spring 42, the pilot pressure acting against the flange will move sleeve 38 little if at all. However, since an increased pilot pressure increases the rate of flow through groove 53, the pressure builds up in reservoir 45 at a faster rate. The time delay is thus decreased as the pilot pressure increases.

Alternatively, sleeve 38 and spring 42 can be selected to make the duration of the time delay virtually independent of the pilot pressure. In this case, an increase in the pilot pressure slides sleeve 38 to the right far enough to compensate for the faster build up of pressure in reservoir 45 due to the increased pilot pressure. Even though the pressure in reservoir 45 builds up faster, it must build up to a higher level in order to overcome the increased force on piston 32 caused by the shift of sleeve 38 to the right and the resultant compression of spring 43. The overall result is that the time delay is insensitive to pressure variations over the range encountered in normal use of the valve.

Other combinations of sleeve 38 and spring 42 can provide response characteristics that vary in any desired manner. The spring 42 can be eliminated if desired since it has been found that a uniform time delay can be achieved without the spring if sleeve 38 presents a sufficiently large pressure face.

The time delay is dependent on the length of time required for air to meter through groove 53 which in turn depends upon the effective length of the groove. Since adjustment of rod 50 changes the effective length of the groove, the time delay may be easily and accurately adjusted by turning knob 51 to extend or retract rod 50. The large travel of rod 50 permits the time delay to be finely adjusted and to be varied through a wide range. Since valve spool 15 is shifted only by the time delay mechanism, the duration of the time delay does not vary from cycle to cycle and valves of different sizes and capacities can be controlled without affecting the manner in which the timer functions.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A time delay valve device for directing pressurized fluid to a load, said device comprising:
    a valve body presenting a cavity therein for receiving pressurized fluid;
    a valve member supported on said body for movement between first and second positions to control the flow of fluid to the load;
    yieldable means urging said valve member toward the first position;
    a piston slidably supported on said valve body;
    a passage through said piston having an inlet end and an outlet end, said inlet end communicating with said cavity to receive fluid therefrom;
    a fluid chamber in said valve body disposed to receive fluid from the outlet end of said passage, said valve member being shiftable from the first position to the second position in response to entry of fluid into said chamber directed against an end of the valve member and opposing the bias of the yieldable means;
    means establishing a releasable seal for the outlet end of said passage to substantially block the flow of fluid into said chamber through said passage;
    a reservoir in said valve body;
    a metering passageway in said valve body providing communication between said cavity and reservoir, said passageway being restricted in size to meter fluid flow into said reservoir to delay the build up of pressure therein; and
    a pressure surface of said piston against which fluid in said reservoir acts in a manner urging said piston to slide in a direction to break said releasable seal, whereby fluid flows through said passage into said chamber to shift said valve member to the second position after a time delay sufficient for the fluid pressure in said reservoir to build up to a predetermined level.

2. A device as set forth in claim 1, including resilient means for sliding said piston in a direction to re-establish said seal when the pressure in said reservoir drops below said predetermined level.

3. A device as set forth in claim 1, wherein said releasable seal comprises a seal element carried on said valve member at a location to engagingly seal the outlet end of said passage.

4. A device as set forth in claim 1, including means for adjusting the effective length of said metering passageway to vary the time delay in the build up of pressure in said reservoir.

5. A device as set forth in claim 1, wherein said metering passageway is of generally spiral configuration.

6. A device as set forth in claim 1, including:
    a bore in said valve body; and
    a rod member disposed in said bore, said rod member and bore cooperating to present said metering passageway in generally spiral extension adjacent the exterior surface of said rod member.

7. A device as set forth in claim 6, including means for adjusting said rod member axially in said bore in a manner to vary the effective length of said metering passageway, thereby varying the time delay in the build up of pressure in said reservoir.

8. A device as set forth in claim 1, including:
    a return passageway in said valve body providing communication of said reservoir with said cavity to direct fluid therebetween, said return passageway being substantially larger than said metering passageway;
    a seal element effecting a seal of said return passageway when the pressure in said cavity exceeds the pressure in said reservoir;
    means for breaking the seal of said seal element when the pressure in said reservoir exceeds the pressure in said cavity, thereby permitting flow of fluid at a relatively high speed through said return passageway from said reservoir to said cavity; and
    a filter associated with said metering passageway for filtering foreign material from the fluid passing therethrough, said filter being disposed in proximity to the path of fluid flowing through said return passageway from said reservoir to said cavity, whereby foreign material is drawn out of said filter in response to high speed fluid flowing along the path toward said cavity.

9. A device as set forth in claim 1, including:
    a slide member supported on said valve body for sliding movement generally toward and away from said piston;
    a pressure surface of said slide member against which fluid in said cavity acts to urge said slide member generally toward said piston; and
    resilient means for urging said piston and slide member away from one another to bias said piston in a direction to establish said releasable seal.

10. A device as set forth in claim 9, including second resilient means urging said slide member in a direction opposite the direction said slide member is urged by fluid in said cavity.

11. A device as set forth in claim 9, including a tube member connected with said piston and presenting a hollow interior extending axially of said tube member to provide said passage, said resilient means including a spring coiled around said tube member at a recessed location within said slide member.

12. In a time delay device for shifting a fluid actuated valve member which controls the flow of fluid to a load, the improvement comprising:
    a valve body presenting a cavity therein for receiving pressurized pilot fluid;
    a piston mounted to said valve body for sliding movement between a first position and a second position;
    means for applying fluid against said valve member in a manner to shift the same in response to movement of said piston from the first position to the second position;
    a slide member mounted to said valve body for sliding movement generally toward and away from said piston, said slide member having a body portion against which fluid in said cavity acts in a manner urging said slide member toward said piston;

resilient means urging said piston and slide member away from one another to bias said piston toward the first position;

a reservoir in said valve body;

metering means for directing fluid from said cavity to said reservoir at a metered rate to thereby delay the build up of fluid pressure in said reservoir; and a pressure surface of said piston against which the fluid in said reservoir acts in a manner urging said piston generally toward said slide member from the first position to the second position and against the bias of said resilient means, whereby said piston is moved to the second position when the fluid pressure in said reservoir builds up to a predetermined level.

13. The improvement set forth in claim 12, including second resilient means urging said slide member away from said piston in a direction generally opposite the direction said slide member is urged by fluid in said cavity.

14. The improvement set forth in claim 12, wherein said resilient means includes a spring engaging said piston and slide member, and in which said piston is carried by a piston rod on which said slide member is sleeved in a manner to slide axially on the piston rod; and said spring is coiled around said piston rod.

15. In a time delay device for shifting a fluid actuated valve member which controls the flow of fluid to a load, the improvement comprising:

a valve body presenting a cavity therein adapted to receive pressurized pilot fluid;

a reservoir in said valve body for receiving pilot fluid from said cavity, said valve member being shiftable in response to build up of pressure in said reservoir to a predetermined level;

a metering passage in said valve body providing communication between said cavity and reservoir, said metering passage being restricted in size to deliver fluid to said reservoir at a metered rate to delay the build up of pressure therein, thereby delaying shifting of said valve member;

a return passage in said valve body providing communication between said reservoir and cavity, said return passage being substantially larger than said metering passage to permit fluid to flow through said return passage at a relatively high speed;

means for substantially blocking fluid flow through said return passage when the pressure in said cavity is greater than the pressure in said reservoir;

means for unblocking said return passage when the pressure in said reservoir is greater than the pressure in said cavity, thereby permitting fluid to flow at a relatively high speed through said return passage from said reservoir to said cavity; and a filter element associated with said metering passage to filter foreign material from the fluid passing therethrough, said filter element being disposed in communication with said return passage at a location wherein foreign material is drawn out of said filter element in response to high speed fluid flow through said return passage from said reservoir to said cavity.

* * * * *